(12) United States Patent
Herrmann

(10) Patent No.: US 7,110,757 B2
(45) Date of Patent: Sep. 19, 2006

(54) REMOTE DIAGNOSIS AND CENTRAL FAULT EVALUATION METHOD OF DECENTRALIZED ELECTRIC DEVICES, AND DECENTRALIZED ELECTRONIC DEVICE

(75) Inventor: Matthias Herrmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 10/343,367

(22) PCT Filed: May 5, 2001

(86) PCT No.: PCT/DE01/01730

§ 371 (c)(1),
(2), (4) Date: Jan. 30, 2003

(87) PCT Pub. No.: WO02/13560

PCT Pub. Date: Feb. 14, 2002

(65) Prior Publication Data

US 2004/0132444 A1    Jul. 8, 2004

(30) Foreign Application Priority Data

Aug. 9, 2000  (DE) ................ 100 38 764

(51) Int. Cl.
*H04Q 7/20* (2006.01)

(52) U.S. Cl. ...................... 455/425; 455/558
(58) Field of Classification Search ................ 455/452; 714/25
See application file for complete search history.

(56) References Cited

U.S. PATENT DOCUMENTS 4,315,311 A * 2/1982 Causse et al. ................ 714/25

FOREIGN PATENT DOCUMENTS

| DE | 196 33 785 A | 2/1998 |
| EP | 0 671 631 A | 9/1995 |
| EP | 0 730 388 A | 9/1996 |
| FR | 2 757 664 A | 6/1998 |

* cited by examiner

*Primary Examiner*—William D. Cumming
(74) *Attorney, Agent, or Firm*—Michael J. Striker

(57) ABSTRACT

A method for remote diagnosis and central error evaluation of decentralized electronic devices (1) with an integrated telecommunications device (3) includes the steps of storing information about malfunctions of a decentralized electronic device (1) in a diagnosis memory (6) of the electronic device (1); making a telecommunications connection of the electronic device (1) with a central error evaluation station (7), controlled by the user of the electronic device (1); transmitting error data from the diagnosis memory (6) to the central error evaluation station (7); and evaluating the error data in the central error evaluation station (7).

7 Claims, 2 Drawing Sheets

REMOTE DIAGNOSIS AND CENTRAL FAULT EVALUATION METHOD OF DECENTRALIZED ELECTRIC DEVICES, AND DECENTRALIZED ELECTRONIC DEVICE

BACKGROUND OF THE INVENTION

The invention relates to a method for remote diagnosis and central error evaluation of decentralized electrical devices, with an integrated telecommunications device. It also relates to a decentralized electronic device with an integrated telecommunications device.

As examples of decentralized electrical devices with an integrated telecommunications device, so-called radiophones re known, which are a combination of a car radio and a GSM telephone in the same housing. Interlinked driver information systems, in the form of a combined navigation system and mobile phone, for use in motor vehicles are also known.

Such systems are quite complex and have numerous functionalities cooperating with one another. The problem in the development and operation of such combined electrical devices is that because of their complexity, they cannot be tested completely in the laboratory; instead, new technical problems can arise when they are used in the field.

Usually, the errors that occur become known to the manufacturer only from complaints and returns of the devices involved, and at the manufacturer, these errors can be statistically evaluated to only a limited extent. The statistical basis for error evaluations is therefore quite small, and the resultant provisions to be taken are limited. Furthermore, the reaction time for eliminating errors and correspondingly rebuilding all the electrical devices that are in the field is too long.

SUMMARY OF THE INVENTION

The object was therefore to create an improved method for remote diagnosis and central error evaluation of decentralized electrical devices with an integrated telecommunications device as well as a correspondingly improved decentralized electrical device with an integrated telecommunications device.

This object is attained by the method, by means of:
  a) storing information about malfunctions of a decentralized electronic device in a diagnosis memory of the electronic device;
  b) making a telecommunications connection of the electronic device with a central error evaluation station, controlled by the user of the electronic device;
  c) transmitting error data from the diagnosis memory to the central error evaluation station;
  d) evaluating the error data in the central error evaluation station.

Thus according to the invention, the information stored in a diagnosis memory of the electrical device is transmitted by the integrated telecommunications device to a central error evaluation station, where the information is evaluated. This has the advantage that in principle a remote diagnosis can be performed for every electronic device freely in use in the field, and the information route from the user of the electronic device to the central error evaluation station is standardized and shortened considerably. The information about the errors can then be analyzed quickly by the development unit connected to the error evaluation station and eliminated.

By statistical evaluation of the error information, accumulations of errors can be detected early. Furthermore, the costs of product testing and repair can be reduced.

In the method, preferably one or more diagnosis programs stored in the diagnosis memory are executed, and only the error data from the diagnosis memory that have been correspondingly selected by the diagnosis program executed are transmitted from the diagnosis memory. By the use of diagnosis programs, the events of diagnosis can be standardized and made easily usable for the user.

The results of diagnosis are preferably transmitted back to the electronic device from the central error evaluation station. In this way, the costs for repair can be reduced, and an immediate reaction to a request for diagnosis can be made. This leads to an increase in the quality of the product and to increased customer satisfaction.

The results of diagnosis can be displayed in the electronic device in a known way. Moreover, maintenance of the electronic device can be performed by a diagnosis program as a function of the results of diagnosis.

A decentralized electronic device with an integrated telecommunications device thus, according to the invention, has a diagnosis memory for storing information about malfunctions of the electronic device. For performing the method described above, this device is embodied such that, under the control of the user of the electronic device, a telecommunications connection is made with the central error evaluation station, and error data from the diagnosis memory are transmitted to the central error evaluation station for evaluation. Because of the user-controlled making of the telecommunications connection, the user has control over the remote diagnosis, so that access to the electronic device against the wishes of the user is not possible.

BRIEF DESCRIPTION OF THE DRAWINGS

The invention is described in further detail below in terms of an exemplary embodiment in conjunction with the accompanying drawing.

DETAILED DESCRIPTION OF THE PREFERRED EMBODIMENTS

Figure 1:
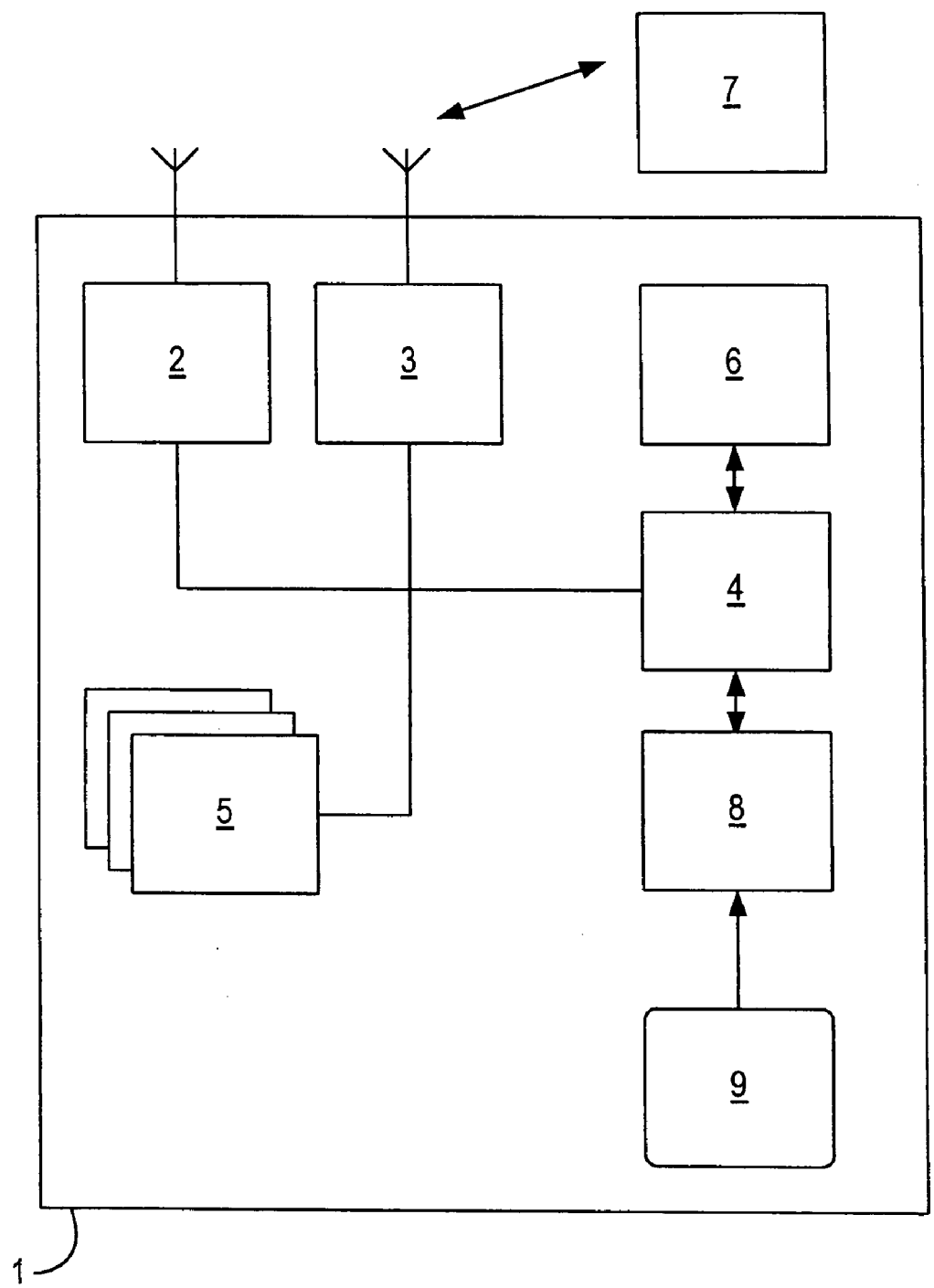
FIG. 1 is a block diagram of one exemplary embodiment for an electronic device 1, in the form of a so-called radiophone, that is, a car radio with an integrated mobile radio part in the same housing.

The electronic device 1 has various system components, such as an AM/FM tuner 2, a telecommunications device 3 in the form of a mobile radio part, a controller 4, and optionally other system components 5. According to the invention, there is an integrated diagnosis memory 6, so that in the event of malfunctions, information accordingly can be stored as error data in the diagnosis memory 6.

The electronic device 1 is embodied such that under user control via the mobile radio part 3, a telecommunications connection is made with a central error evaluation station 7, and error data from the diagnosis memory 6 are transmitted to the central error evaluation station 7. The error data are then evaluated in the central error evaluation station 7, and results of diagnosis are optionally transmitted back to the electronic. This information can either be displayed in the electronic device 1 and/or used for maintenance of the electronic device 1.

The making of the connection and the transmission of error data from the diagnosis memory 6 are preferably made to only one or more predefined telephone numbers that cannot be changed by the user. This makes the method for remote diagnosis simple and easy to perform and relatively secure against abuse.

In the exemplary embodiment shown, a card reader 8 is also provided, for executing special diagnosis programs that are stored on a diagnosis card 9. The diagnosis card 9 serves to make the system secure; not until the diagnosis card 9 is inserted into the card reader 8 are the functions for making a telecommunications connection with the central error evaluation station 7 and for executing various diagnosis programs stored in the card activated. Diagnosis programs are provided that enable a selection of regions of the diagnosis memory 6, or in other words a selection of the error data to be transmitted and evaluated. A storage in memory and the display of results of diagnosis are also possible only by means of an inserted diagnosis card 9. In the same way, maintenance of the electronic device 1 as a function of the results of diagnosis can be done only in conjunction with the diagnosis card 9 and a diagnosis program stored in the diagnosis cards 9.

The diagnosis card 9 is preferably made anonymous, so that particularly when error data are transmitted to the central error evaluation station 7, a user's identity will not be transmitted too. This also assures that for the statistical error evaluation, performed by storing the error data in memory in the central error evaluation station 7, no personal data will be acquired in the process.

Figure 2:
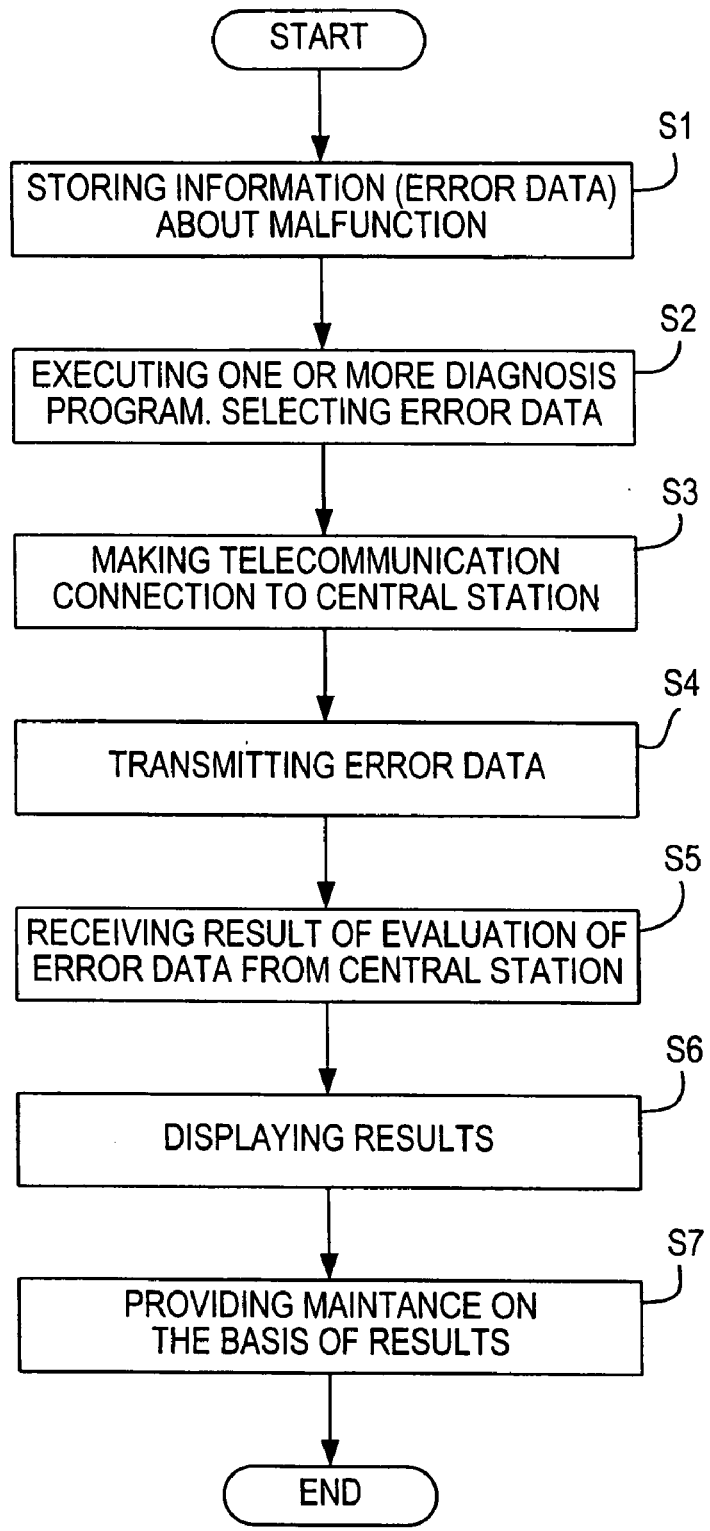
FIG. 2 is a flow diagram illustrating the method of the present invention.

FIG. 2 shows a flowchart of the inventive method for remote diagnosis and central error evaluation of decentralized electronic devices 1, with an integrated telecommunications device 3. In step S1 storing of information (error data) about malfunction is performed. Execution of one or more diagnosis program to select error data is carded out in next step S2. In step S3 telecommunication connection to central station is made. Then, in step S4 error data are transmitted. Results of evaluation of error data from a central station are received in step S5. The results are then displayed in step S6. Finally, maintenance is provided on the basis of results, in step S7.

The invention claimed is:

1. A method for remote diagnosis and central error evaluation of decentralized electronic devices with integrated telecommunications devices, the method comprising the steps at:

storing information about malfunction of a decentralized electronic device as error data in a diagnosis memory of the electronic device;

executing one or more diagnosis programs stored in the diagnosis memory to select error data from the diagnosis memory;

making a telecommunications connection of the electronic device with a central error evaluation station controlled by a user of the electronic device;

transmitting error data from the diagnosis memory to the central error evaluation station; and receiving results of diagnosis from the central error evaluation station by the electronic device after evaluation of the error data in the central evaluation station.

2. A method as defined in claim 1; and further comprising displaying the results of diagnosis in the electronic device.

3. A method as defined in claim 1; and further comprising providing maintenance of the electronic device by the diagnosis program as a function of the results of the diagnosis.

4. A method as defined in claim 1; and further comprising storing the diagnosis programs on a separate diagnosis card, so that the method can not be performed until the diagnosis current is read by a card reader connected trough an electronic device.

5. A decentralized electronic device, comprising integrated telecommunications devices; a diagnosis memory for storing information about malfunctions of the electronic device as error data; a diagnosis card, such that diagnosis programs are stored in said diagnosis memory or in said diagnosis card for selecting error data from the diagnosis memory; a central error evaluation station to which the selected error data are transmitted, the electronic device being formed for making a telecommunications connection of the electronic device with said central error evaluation station controlled by a user of the electronic device for transmitting the error data from the diagnosis memory to the central error evaluation station and for receiving results of diagnosis from the central evaluation station by the electronic device after evaluation of the error data In the central evaluation station.

6. A decentralized electronic device as defined in claim 5, wherein the electronic device is formed so that the diagnosis programs for maintaining the electronic device are embodied as a function of the results of diagnosis.

7. A decentralized electronic device as defined in claim 5, and further comprising a card reader for reading the error data from the diagnosis card.

* * * * *